R. L. ARNDT.
TRACTION BELT.
APPLICATION FILED MAY 1, 1919.
1,328,643.
Patented Jan. 20, 1920.
2 SHEETS—SHEET 1.
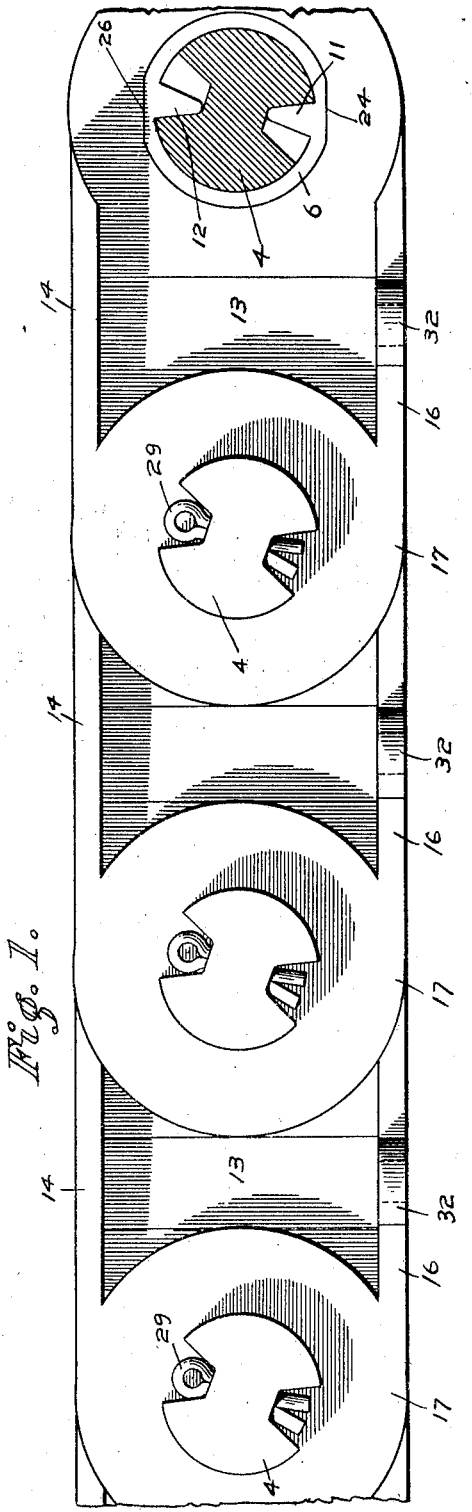
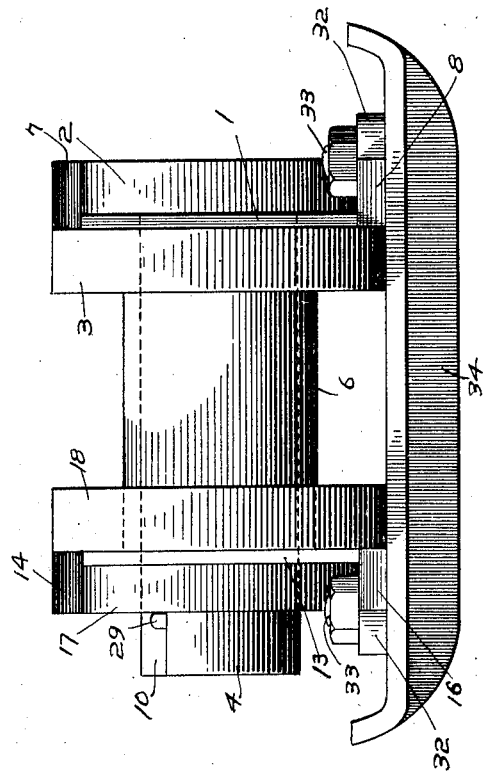
INVENTOR
RICHARD L. ARNDT
BY
Baldwin Vale
ATTORNEY

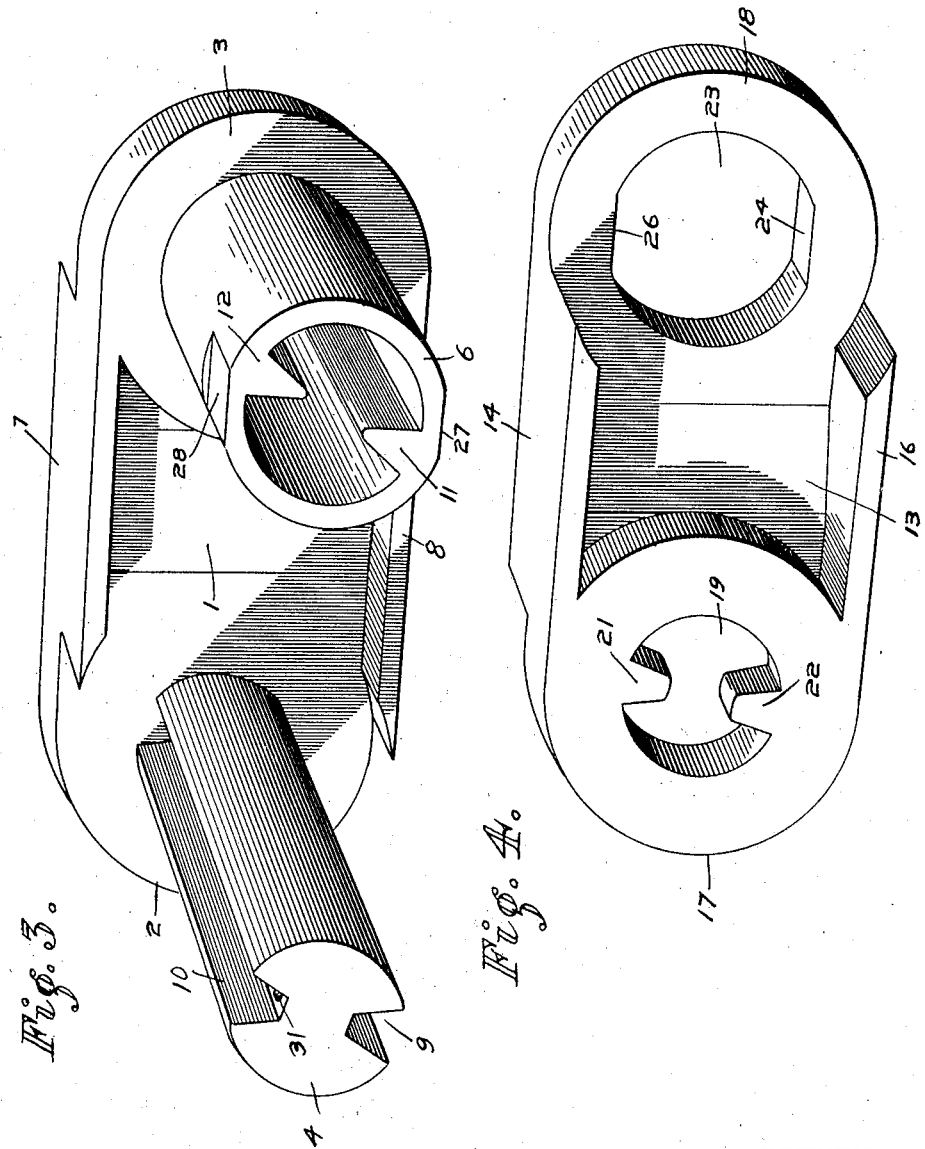

UNITED STATES PATENT OFFICE.

RICHARD L. ARNDT, OF SAN FRANCISCO, CALIFORNIA, ASSIGNOR TO UNION TRACTOR COMPANY, OF SAN FRANCISCO, CALIFORNIA, A CORPORATION OF CALIFORNIA.

TRACTION-BELT.

1,328,643. Specification of Letters Patent. Patented Jan. 20, 1920.

Application filed May 1, 1919. Serial No. 294,014.

*To all whom it may concern:*

Be it known that I, RICHARD L. ARNDT, a citizen of the United States, and a resident of the city and county of San Francisco, State of California, have made a new and useful invention—to wit, Improvements in Traction-Belts; and I do hereby declare the following to be a full, clear, concise, and exact description of the same.

The invention relates particularly to the construction, arrangement and combination of the links forming the traction belt.

Among the objects of the invention are to form the articulate joints in the belt so that it may bend freely in traveling around its supporting sprockets, while unbendable in the opposite direction, forming a rigid bridge between the sprockets.

Another object is to design the assembled parts so that they may be integrally cast or formed of manganese steel or the like, and assembled in operative relation without mechanical finishing. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In accordance with modern practice traction wheels have been displaced for certain purposes by endless traction belts encircling driven and idle sprockets mounted in suitable frames and encircled by articulated traction belts. The portion of these belts between the sprockets presents a greatly increased traction area, compared to traction wheels of practicable size. It is the usual practice at the present time to use the upper surface of the ground portion of the traction belts between the sprockets on opposite sides of the tractor as tracks upon which rollers travel supporting a portion of the weight of the tractor. It is one of the objects of this invention to eliminate the necessity for these supporting rollers by forming the traction belts bendable in one direction only, whereby the load is supported by the horizontally rigid ground portion of the belts between the sprockets, in this manner reducing the wear and tear and cost of upkeep of the traction belts and thus more nearly approaching the economy that is the desirable feature of the traction wheel that it displaces.

In the accompanying two sheets of drawings,

Figure 1 is a side elevation of a portion of a traction belt constructed in accordance with this invention.

Fig. 2 is an end elevation of the same, with the grouser plates attached thereto.

Fig. 3 is a detail in perspective of one of the link plates forming the links of the belt.

Fig. 4 is a similar view of the opposite plate for forming the link when combined with Fig. 3.

In detail the construction illustrated in the drawings, see Fig. 3, comprises the side plate 1 having the rounded ends 2 and 3 laterally offset in parallel alinement, whereby the ends 2 overlap the ends 3 of the contiguous link. The gudgeon pin 4 is integrally formed with the plate 1 and projects at right angles from the plane and concentric with the axis of the end 2. The sleeve 6 is similarly located and projects from the plane of the end 3. The plane of the plate 1 diverges obliquely in accordance with the offset relation of the ends 2 and 3. The flanges 7 and 8 project on opposite sides of the top and bottom edges of the plate 1 and contribute to the strength of the link sides.

The gudgeon pin 4 is provided with the longitudinal grooves 9 and 10, extending throughout its length, above and below the center thereof. The sleeve 6 is provided with the inwardly extending lugs 11 and 12 adapted to engage in the grooves 9 and 10 of the gudgeon pin of the contiguous link when assembled. The plate 13 of the opposite link side is similar to the plate 1 with respect to the flanges 14 and 16 connecting the circular ends 17 and 18. The end 17 is provided with a hole 19 having internally projecting lugs 21 and 22 adapted to snugly fit the gudgeon 4. The end 18 is provided with the hole 23 having the flattened sides 24 and 26 adapted to snugly fit the end of the sleeve 6, having the flattened portions 27 and 28.

The links are assembled by sliding the sleeve 6 over the gudgeon pin 4 of the contiguous link, then assembling the plate 13 so that the hole 19 engages the gudgeon 4 and the hole 23 encircles the end of the sleeve 6. The composite links thus formed and thus joined end to end, see Fig. 1, form an endless belt of the desired length. The assembly is maintained by inserting the split pins 29 transversely through the holes 31 through the ends of the gudgeon 4, outside the ends 17.

The flanges 8 and 16 are provided with the outward extending lugs 32 to receive the bolts 33 for attaching the grouser plates 34 to the outer surface of the traction belt. These grouser plates are conventional in form and are adapted to provide a suitable traction area and exclude dirt from the working parts of the belt while supporting the load thereon.

Foundry practice has progressed to a degree where the shapes illustrated may be cast in manganese steel to fit perfectly and of such hardness that wear is practically eliminated with or without lubrication between the contacting surfaces.

The traction belt is in effect a sprocket chain with the transverse sleeves 6 surrounding the axis of the articulate joints and adapted to be engaged by the teeth of the driving sprocket for the application of tractive effort.

This invention operates substantially as follows: There is just sufficient play between the lugs 11 and 12 in the grooves 9 and 10 to permit pivotal action of the gudgeons 4 in the sleeves 6, sufficient to permit the belt to bend around the sprockets in one direction only. Bending in the opposite direction is prevented by the abutment of the lugs 11 and 12 against the side of the grooves 9 and 10 when the belt is in horizontal alinement, see Fig. 1. Where the belt span between the sprockets is of considerable length the abutment of the lugs 11 and 12 in the grooves 9 and 10 can be arranged so that the ground portion of the belt cannot attain a straight horizontal line, but maintains a camber or inverted arch between the sprockets. This arcuate form better withstands the downward pressure of the tractor weight.

Having thus described my invention, what I claim and desire to secure by Letters Patent is:—

1. A traction belt comprising a series of link plates; gudgeon pins on said plates; sleeves on said plates having internal lugs engaging said pins.

2. A traction belt comprising a series of link plates; grooved gudgeon pins on said plates; sleeves on said plates having internal lugs engaging said grooves.

3. A traction belt comprising a series of link plates; grooved gudgeon pins on said plates; sleeves on said plates pivotal on said pins and having internal lugs engaging said grooves.

4. A traction belt comprising a series of link plates; externally grooved gudgeon pins on said plates; sleeves on said plates having internal lugs engaging said grooves, whereby said belt is bendable in one direction only.

5. A traction belt comprising a series of links composed of two side plates one of said plates having extending outwardly from its respective ends a grooved gudgeon pin and a hollow sleeve with internal lugs; and the other of said plates having holes in its ends to fit the ends of said pin and sleeve respectively, and a removable means for holding said pins in said sleeves when the said links are joined together.

In testimony whereof I have hereunto set my hand at San Francisco, California, this 31st day of March, 1919.

RICHARD L. ARNDT.